Figure 1:
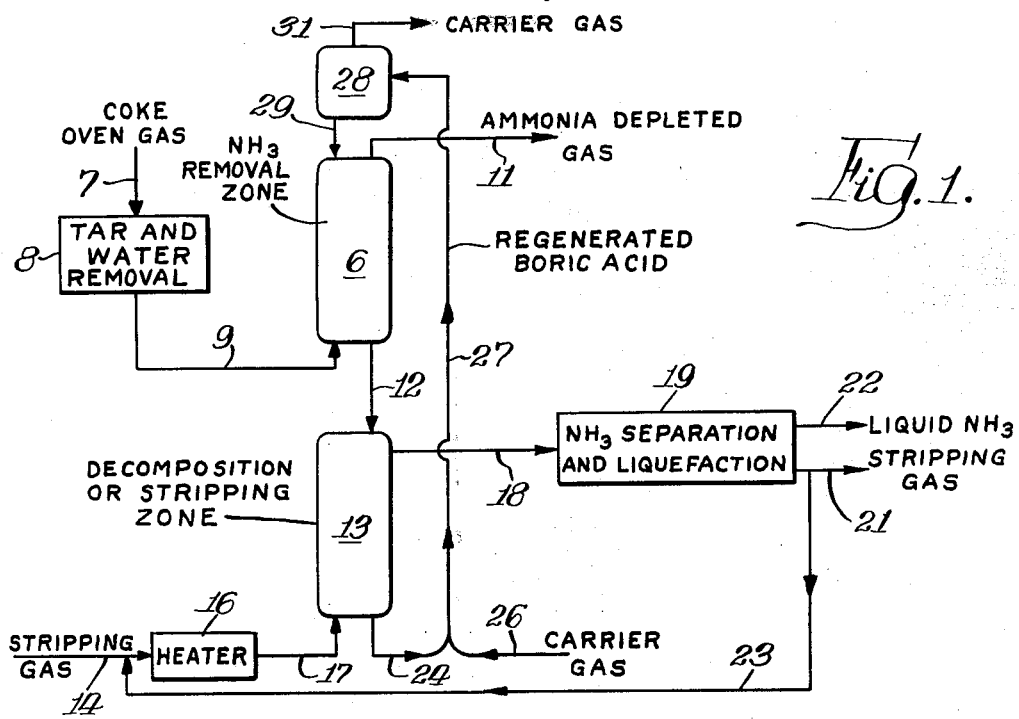

INVENTORS.
James W. Halley,
Michael O. Holowaty,
BY Davis, Lindsey, Hibben & Noyes
Attys.

United States Patent Office 3,149,918
Patented Sept. 22, 1964

3,149,918
RECOVERY OF AMMONIA FROM AMMONIA-CONTAINING GASES
James W. Halley, Dune Acres, and Michael O. Holowaty, Gary, Ind., assignors to Inland Steel Company, Chicago, Ill., a corporation of Delaware
Filed July 3, 1961, Ser. No. 132,516
17 Claims. (Cl. 23—196)

This application is a continuation-in-part of our copending application Serial No. 768,353, filed October 20, 1958, now abandoned.

This invention relates to the recovery of ammonia from ammonia-containing gases such as coke oven gas or the like. More particularly, the invention relates to a novel and improved process for the selective recovery of anhydrous ammonia from feed gases containing ammonia and organic bases such as pyridine and the like.

In connection with the production of coke it is common practice to recover ammonia and other valuable by-products from the coke oven gases. In some instances, the ammonia is recovered as a concentrated aqueous solution. Another commonly used procedure involves contacting the coke oven gas with sulfuric acid to form ammonium sulfate crystals which are separated from the acid liquor. From time to time other chemical reagents have been proposed for reaction with the ammonia content of such gases so as to separate the ammonia in the form of a salt.

The use of sulfuric acid for the recovery of ammonia from ammonia-containing gases is relatively expensive since it entails the consumption of large quantities of sulfuric acid. Furthermore, the process is limited to the recovery of ammonia in the form of ammonium sulfate. Consequently, under certain economic conditions the process may not be attractive, e.g. when the price of sulfuric acid is high and when there is an excess of available ammonium sulfate on the market or a shortage of storage facilities for ammonium sulfate. The present invention avoids the aforementioned difficulties by utilizing a solid chemical reagent which is capable of combining with the ammonia content of an ammonia-containing gas to form an intermediate compound or complex which can thereafter be decomposed to liberate anhydrous gaseous ammonia while at the same time regenerating the reagent for reuse in the process. Consequently, the process offers the advantage of permitting the recovery of ammonia in anhydrous form while at the same time avoiding the consumption of an expensive chemical reagent. In addition, the process of the present invention is characterized by selectively removing ammonia while leaving unaffected other compounds such as pyridine and similar organic bases.

Accordingly, a primary object of the invention is to provide an improved process for recovering the ammonia content of coke oven gas or the like in the form of anhydrous ammonia as the end product.

A further object of the invention is to provide an improved process for the treatment of ammonia-containing gas to recover its ammonia content without any net consumption of expensive chemicals.

Another object of the invention is to provide a novel and improved method for the recovery of ammonia from coke oven gas which is characterized by a high degree of selectivity of ammonia removal, particularly with respect to organic bases such as pyridine.

Figure 2:
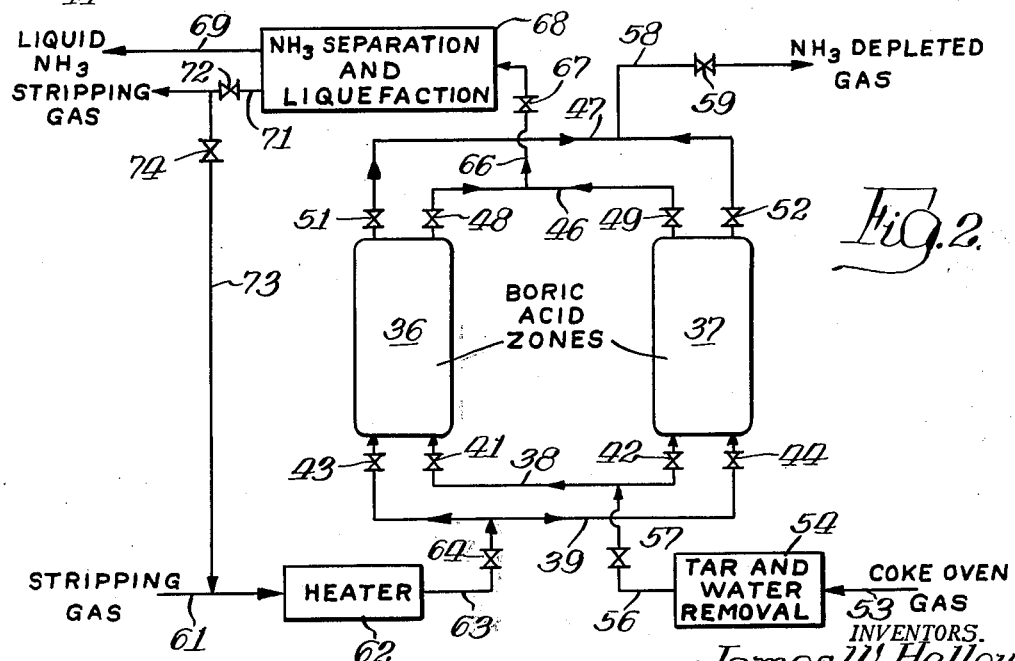

Other objects and advantages of the invention will become apparent from the subsequent detailed description taken in conjunction with the accompanying drawings, wherein:

FIG. 1 is a generally schematic flow diagram showing one method of practicing the invention; and FIG. 2 is a generally schematic flow diagram showing another method of practicing the invention.

Briefly described, the process of the present invention comprises contacting the ammonia-containing gas with subdivided solid or crystalline boric acid to form a solid ammonia-boric acid reaction product and thereby selectively removing ammonia from the gas. Subsequently, the solid reaction product is decomposed at an elevated temperature whereby to liberate anhydrous gaseous ammonia while at the same time regenerating the boric acid for reuse in the process. The liberated gaseous ammonia is removed as formed and may thereafter be condensed or liquefied by well known means to provide anhydrous liquid ammonia. As will hereinafter appear, any of the well known techniques which are commonly employed in pulverized solids-gas contacting systems may be used in practicing the present invention.

Although the invention is described herein with particular reference to the recovery of ammonia from coke oven gas, it is to be understood that the process is applicable to the treatment of ammonia-containing gases generally.

Referring first to FIG. 1, the process of the invention is illustrated in connection with a so-called moving bed type operation which involves countercurrent flow of ammonia-containing gas and granular or subdivided particles of solid boric acid, namely, orthoboric acid, $H_3BO_3$. The particle size of the boric acid is not particularly critical, but it is generally preferred to utilize a particle size of from about ¼ inch to about 20 mesh. The particles of solid or crystalline boric acid move downwardly by gravity through a vessel 6 which comprises an ammonia removal or absorption zone. Raw coke oven gas is introduced through a line 7 and is treated by well known methods at 8 for the extraction of tar and the removal of water or other impurities. The coke oven gas still containing ammonia and organic bases such as pyridine then passes upwardly from a line 9 through the downwardly moving bed of boric acid in the vessel 6. The solid boric acid reacts substantially solely with the ammonia content of the coke oven gas to form a solid reaction product which may be ammonium borate or a loose ammonia-boric acid complex, the exact nature of the reaction not being entirely understood. As the gas passes upwardly through the vessel 6 in contact with the downwardly moving bed of boric acid, the ammonia content of the gas is substantially completely and selectively removed and the effluent coke oven gas containing pyridine or other organic bases is withdrawn through a line 11.

The reaction of ammonia with boric acid is strongly exothermic with the result that the temperature in the ammonia absorption or removal zone 6 tends to rise and must be controlled so as not to exceed the minimum temperature for dehydration of the boric acid. In the usual coke oven gas, the ammonia content of the gas may range from about 0.5% to about 1.2%. When treating gases having a relatively high concentration of ammonia it will be particularly desirable to control the temperature rise in the zone 6. Such temperature control can be effected by removal of the heat of reaction, e.g. by providing suitable internal or external cooling means for the vessel 6 or by suitable regulation of the feed rate of the gas through the line 9 and also the feed rate of the boric acid particles passing downwardly through the zone 6 so that excess heat of reaction is dissipated by radiation from the vessel 6.

In general, it is desirable to maintain the temperature in the ammonia removal zone within the range of from about 150° F. to about 200° F., and preferably not in excess of about 180° F. since, as will hereinafter appear, the ammonia-boric acid reaction product is decomposable at elevated temperatures. Moreover, at temperatures above a minimum of about 212° F., orthoboric acid dehydrates to form metaboric acid which is converted to tetraboric acid at about 284° F., and above about 365° F. boric oxide is formed. Although the removal zone 6 may be operated satisfactorily at atmospheric pressure, it is within the scope of the invention to operate this zone at superatmospheric pressures, e.g. from about 5 to about 15 p.s.i.

It has been found that in most instances the solid boric acid particles can effectively absorb ammonia up to about 10% by weight of the boric acid. Moreover, the reaction of boric acid with ammonia is highly selective. For example, in the case of coke oven gas, 99% or more of the ammonia can be removed from the gas while other compounds, including cyclic bases such as pyridine, remain unaffected. Accordingly, the process is capable of separating ammonia having a high degree of purity. Because of the high efficiency of removal of ammonia by reaction with the boric acid, the relative feed rates of the gas and the boric acid and the time of contact therebetween in the zone 6 may be subject to considerable variation and will ordinarily be regulated in accordance with the design capacity of the unit and in accordance with the temperature control requirements as described above. Generally speaking, satisfactory results are obtainable with gases containing from about 0.1% to about 10% ammonia at a contact time of from about 0.5 to about 4 seconds. Although it will generally be most convenient to correlate the flow rate of the upwardly moving gas with the particle size range of the downwardly moving boric acid to obtain a non-fluidized moving bed type operation, it is also within the scope of the invention to utilize relatively higher gas flow rates sufficient to provide an agitated or fluidized operation which is well known to those skilled in the solids-gas contacting art.

The reaction of solid boric acid with gaseous ammonia as herein contemplated is exothermic and is also readily reversible:

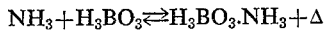
$$NH_3 + H_3BO_3 \rightleftharpoons H_3BO_3 \cdot NH_3 + \Delta$$

As depicted in the foregoing equation, the forward (or ammonia absorption) reaction and the reverse (or decomposition) reaction are in equilibrium. However, in the absorption zone 6 as herein described, the equilibrium is shifted in the forward direction by reason of the fact that gaseous $NH_3$ is continuously supplied to the reaction zone and at the same time heat is continuously removed or dissipated from the reaction zone. Conversely, the equilibrium may readily be shifted in the reverse direction by supplying heat to the system and at the same time continuously removing gaseous ammonia or decreasing its partial pressure. By altering the equilibrium or driving force in the aforesaid manner, both the forward and reverse reactions can be accomplished within generally the same temperature range as long as the decomposition temperature of the boric acid is not exceeded. Thus, the ammonia-boric acid reaction product can easily be regenerated to permit the recovery of anhydrous ammonia and to make the boric acid available for reuse in the process.

The solid reaction product of ammonia and boric acid is continuously withdrawn from the bottom of the vessel 6 through a line 12 and is introduced into a vessel 13 which comprises a decomposition or desorption zone. As heretofore mentioned, the ammonia-boric acid reaction product is readily decomposable by supplying heat and removing or decreasing the partial pressure of the resultant gaseous ammonia. One convenient means of effecting the desired decomposition, as shown in FIG. 1, comprises the use of an inert stripping gas, such as air, nitrogen, carbon dioxide, etc. The stripping gas is introduced through a line 14 to a heater 16 where it may be raised to an elevated temperature of from about 200° F. to about 300° F. and is then introduced through a line 17 to the bottom of the vessel 13. The hot stripping gas is passed in countercurrent contact with the downwardly moving ammonia-boric acid reaction product so as to supply the heat required for effecting the desired decomposition reaction. In order to avoid dehydration or decomposition of the boric acid, the temperature in the zone 13 preferably should not exceed about 180° F., but in general the temperature may be from about 150° F. to about 200° F. By withdrawing the stripping gas from the top of the zone 13 through a line 18 the liberated gaseous ammonia is removed in admixture with the stripping gas. This gas stream is then subjected to suitable treatment, indicated schematically at 19, for the separation of the inert stripping gas at 21 and the condensation and separation of anhydrous ammonia at 22. If desired, the separated stripping gas may be returned by a line 23 to the line 14 for reuse in the decomposition step.

From the bottom of the decomposition zone 13 the regenerated boric acid is withdrawn through a line 24 and is available for recycle to the ammonia removal zone 6. Any suitable means of returning the regenerated boric acid to the zone 6 may be employed. By way of illustration, FIG. 1 shows a gas lift technique employing a suitable carrier gas such as air which is introduced through a line 26 for entraining the particles of boric acid and transporting them vertically through a transfer line 27 to a separation or a disengaging zone 28. In the zone 28, the velocity of the carrier gas stream is rapidly reduced so that the particles of boric acid fall out of suspension and may be passed by gravity from the zone 28 through a line 29 to the ammonia removal zone 6. The separated carrier gas is withdrawn from the zone 28 through a line 31.

It should be understood that other methods of effecting the desired decomposition of the ammonia-boric acid reaction product may also be used. For example, the reaction product may be subjected to heat without the use of a stripping gas stream and the resultant gaseous ammonia may be removed by pumping the gas from the decomposition zone under reduced or subatmospheric pressure.

Referring now to FIG. 2, another method of practicing the process is shown wherein the boric acid particles are utilized in a so-called fixed bed type of operation. Since the process utilizes a reagent capable of regeneration, it will generally be desirable to provide a plurality of contact zones containing fixed beds of subdivided boric acid so that one or more zones may be utilized for the removal of ammonia while the remaining zone or zones are undergoing regeneration, thereby providing a continuous operation. In FIG. 2, only two such zones, designated at 36 and 37, are shown for the sake of simplicity but it will be understood that any desired number of contact zones may be employed. Each of the zones 36 and 37 may contain a quantity of solid or crystalline orthoboric acid having a particle size as previously described in connection with FIG. 1. In some instances, it may be desirable to utilize a mixture of boric acid particles with an inert filler material, such as alumina, in order to provide increased gas permeability and thereby facilitate passage of the ammonia-containing gas through the beds of boric acid. It is also possible, both in the FIG. 1 and FIG 2 embodiments, to employ particles of an inert carrier material such as alumina having deposited thereon a film or outer coating of solid boric acid in order to increase the structural strength of the bed of contact material.

In order to provide for intermittent or cyclic operation of each of the zones 36 and 37, interconnecting inlet manifolds 38 and 39 are provided between the two zones, these manifolds also having valves 41–42 and 43–44, respectively. A generally similar pair of outlet manifolds 46 and 47 are also provided between the zones 36 and 37 and are equipped with valves 48–49 and 51–52, respectively.

Coke oven gas is introduced through a line 53 and is treated in a zone 54 for the removal of tar, water and other contaminants. The treated gas is passed through a line 56 having a valve 57 to the inlet manifold 38. The residual gas of depleted ammonia content is withdrawn from the manifold 47 through a line 58 having a valve 59.

After either of the zones 36 or 37 has been on stream for a sufficient time to effect optimum absorption of ammonia as evidenced by the appearance of ammonia in the residual gas stream removed through the line 58, the particular zone is taken out of operation and is then subjected to regeneration. For regenerating the ammonia-boric acid reaction product, a stripping gas is introduced through a line 61 to a heater 62 and is thence introduced through a line 63 having a valve 64 to the manifold 39. The effluent stripping gas stream containing liberated gaseous ammonia is withdrawn from the manifold 46 through a line 66 containing a valve 67. In a zone 68, the liberated gaseous ammonia is condensed and separated as anhydrous liquid ammonia at 69, and the stripping gas is also separated and withdrawn through a line 71 having a valve 72. If desired, all or part of the stripping gas may be recirculated from the line 71 through a line 73 having a valve 74.

In a typical operation, zone 36 may be considered as being used for the absorption of ammonia while zone 37 is being regenerated. In such case, valves 42, 43, 52 and 48 are closed while valves 41, 44, 51, and 49 are open. The coke oven gas passes from the manifold 38 through the open valve 41, through the zone 36, and through the open valve 51 in the manifold 47 to the withdrawal line 58. In zone 37, the stripping gas passes from the manifold 39 through the open valve 44, through the zone 37, and through the open valve 49 in the manifold 46 to the withdrawal line 66. After a suitable period of time, the valves are reversed so that the previously regenerated zone 37 now becomes the processing zone and the zone 36 now undergoes regeneration. Thus, the coke oven gas now passes from the manifold 38 through the open valve 52 in the manifold 47 to the withdrawal line 58. At the same time, the stripping gas passes from the inlet manifold 39 through the open valve 43, through the zone 36, and through the open valve 48 of the outlet manifold 46 to the withdrawal line 66. It will be understood that the cycle is thereafter repeated in the same manner.

By way of further illustrating invention, the following specific example is presented of a small scale operation which is indicative of the results obtainable by the present invention.

In a vessel having an internal diameter of 4 inches a fixed bed 18 inches high was provided comprising a mixture of crystalline orthoboric acid and alumina pellets, the latter being included for increased permeability of the bed. The particle size of the boric acid granules was approximately 20 mesh and the alumina pellets had a particle size of approximately ¼ inch. The total weight of the bed was about 4 pounds in the ratio of about 1 lb. of boric acid particles to about 3 lbs. of alumina pellets. Raw coke oven gas having an ammonia content of about 0.75%, as obtained from a commercial coke oven, was passed upwardly through the bed at a rate of about 1 cubic foot per minute. Gas analysis of the effluent coke oven gas showed that about 99.72% of the ammonia had been removed and that only traces of pyridine compounds were removed. Thus, the highly selective nature of the process was clearly shown. Subsequently, the solid ammonia-boric acid reaction product was regenerated by passing therethrough a stream of hot air thereby heating the reaction product at a temperature of about 175° F. and liberating gaseous ammonia which was removed with the air stream.

We claim:

1. A process for selectively removing ammonia from a feed gas containing ammonia and an organic base such as pyridine which comprises contacting said feed gas with subdivided solid boric acid whereby to effect exothermic reaction of said boric acid substantially solely with the ammonia in said feed gas to form a solid ammonia-boric acid reaction product, and removing the evolved heat of reaction so that the reaction temperature does not exceed the minimum temperature for dehydration of said boric acid.

2. The process of claim 1 further characterized in that said reaction temperature is from about 150° F. to about 200° F.

3. The process of claim 1 further characterized in that said reaction temperature is not in excess of about 180° F.

4. The process of claim 1 further characterized in that said feed gas comprises coke oven gas.

5. A process for selectively removing ammonia from a feed gas containing ammonia and an organic base such as pyridine which comprises contacting said feed gas with subdivided solid boric acid whereby to effect exothermic reaction of said boric acid substantially solely with the ammonia in said feed gas to form a solid ammonia-boric acid reaction product, removing the evolved heat of reaction so that the reaction temperature does not exceed the minimum temperature for dehydration of said boric acid, separating residual gas of depleted ammonia content from said reaction product, thereafter heating said reaction product to a temperature sufficient to decompose the same but below the minimum temperature for dehydration of said boric acid whereby to liberate gaseous ammonia and form regenerated boric acid, and removing as it is formed gaseous ammonia which is substantially free of said bases.

6. The process of claim 5 further characterized in that said heating and decomposition step is carried out by passing a heated inert stripping gas through the reaction product and removing the liberated gaseous ammonia in admixture with said stripping gas.

7. The process of claim 5 further characterized in that the temperature of both the exothermic reaction step and the decomposition step is from about 150° F. to about 200° F.

8. The process of claim 5 further characterized in that the temperature of both the exothermic reaction step and the decomposition step is not in excess of about 180° F.

9. A process for selectively removing ammonia from a feed gas containing ammonia and an organic base such as pyridine which comprises passing said feed gas in countercurrent contact with subdivided solid boric acid in an ammonia removal zone whereby to effect exothermic reaction of said boric acid substantially solely with the ammonia in said feed gas to form a solid ammonia-boric acid reaction product, removing the evolved heat of reaction from said ammonia removal zone so that the reaction temperature does not exceed the minimum temperature for dehydration of said boric acid, withdrawing ammonia depleted gas from said ammonia removal zone, passing said reaction product from said ammonia removal zone to a decomposition zone, heating said reaction product in said decomposition zone to a temperature sufficient to decompose said reaction product but below the minimum temperature for dehydration of said boric acid whereby to liberate gaseous ammonia and form regenerated boric acid, withdrawing from said decomposition zone as it is formed the gaseous ammonia which is substantially free of said bases, and returning said regenerated boric acid from said decomposition zone to said ammonia removal zone.

10. The process of claim 9 further characterized in that the heating and decomposition of said reaction product is carried out by passing a heated inert stripping gas through said decomposition zone in contact with said reaction product and removing the liberated gaseous ammonia in admixture with said stripping gas.

11. The process of claim 9 further characterized in that the temperature in both said ammonia removal zone and said decomposition zone is from about 150° F. to about 200° F.

12. The process of claim 9 further characterized in that the temperature in both said ammonia removal zone and said decomposition zone is not in excess of about 180° F.

13. A process for selectively removing ammonia from a feed gas containing ammonia and an organic base such as pyridine which comprises passing said feed gas through a contact zone containing a stationary bed of subdivided solid boric acid whereby to effect exothermic reaction of said boric acid substantially solely with the ammonia in said feed gas to form a solid ammonia-boric acid reaction product, removing the evolved heat of reaction from said zone so that the reaction temperature does not exceed the minimum temperature for dehydration of said boric acid, withdrawing ammonia depleted gas from said zone, temporarily discontinuing passage of said feed gas through said zone, passing a heated inert stripping gas through said zone at a temperature sufficient to decompose said reaction product but below the minimum temperature for dehydration of said boric acid whereby to liberate gaseous ammonia and form regenerated boric acid, withdrawing from said zone as it is formed the liberated gaseous ammonia in admixture with said stripping gas, said liberated gaseous ammonia being substantially free of said bases, and thereafter discontinuing the flow of stripping gas and resuming the passage of said feed gas through the regenerated boric acid.

14. The process of claim 13 further characterized in that the temperature in said zone during both the exothermic reaction and the decomposition steps is from about 150° F. to about 200° F.

15. The process of claim 13 further characterized in that the temperature in said zone during both the exothermic reaction and the decomposition steps is not in excess of about 180° F.

16. The process of claim 13 further characterized in that said bed comprises a mixture of subdivided crystalline boric acid and a subdivided substantially inert filler material to impart increased permeability to the bed.

17. The process of claim 16 further characterized in that said filler material comprises alumina.

References Cited in the file of this patent

FOREIGN PATENTS 2,736 of 1855    Great Britain    Dec. 5, 1855

OTHER REFERENCES

Mellor: "A Comprehensive Treatise on Inorganic and Theoretical Chemistry, Longmans, Green and Co., New York, New York, vol. 5, 1924, pages 79 and 80.